United States Patent
Bruna (10) Patent No.: US 9,834,331 B2
(45) Date of Patent: Dec. 5, 2017

(54) SCENT PERMEATION CONTAINER SEAL, CONTAINER INCLUDING SAID SEAL AND METHODS OF MAKING SAID SEAL AND SAID CONTAINER

(71) Applicant: Tekni-Plex, Wayne, PA (US)

(72) Inventor: Juan Bruna, Miami, FL (US)

(73) Assignee: Tekni-Plex, Inc., Wayne, PA (US)

( * ) Notice: Subject to any disclaimer, the term of this patent is extended or adjusted under 35 U.S.C. 154(b) by 24 days.

(21) Appl. No.: 14/592,420

(22) Filed: Jan. 8, 2015

(65) Prior Publication Data

US 2015/0122818 A1 May 7, 2015

Related U.S. Application Data

(63) Continuation-in-part of application No. 13/922,994, filed on Jun. 20, 2013, now abandoned.
(Continued)

(51) Int. Cl.
| | |
|---|---|
| *B65D 53/04* | (2006.01) |
| *B65B 61/02* | (2006.01) |
| *B65D 51/16* | (2006.01) |
| *B65D 51/20* | (2006.01) |
| *B23K 26/40* | (2014.01) |
| *B23K 26/361* | (2014.01) |
| *B29C 65/48* | (2006.01) |
| *B23K 103/16* | (2006.01) |

(52) U.S. Cl.
CPC ............ *B65B 61/02* (2013.01); *B23K 26/361* (2015.10); *B23K 26/40* (2013.01); *B65D 51/1605* (2013.01); *B65D 51/20* (2013.01); *B23K 2203/172* (2015.10); *Y10T 29/49826* (2015.01); *Y10T 83/0215* (2015.04); *Y10T 83/04* (2015.04); *Y10T 156/1064* (2015.01)

(58) Field of Classification Search
CPC . A61J 1/00; B65D 75/326; B65D 2575/3245; B65D 41/00; B65D 41/20; B65D 51/16; B65D 53/00; B65D 51/20; A61B 17/1222; A61B 19/026; B23K 26/36; B23K 26/40; B23K 26/361; B23K 2203/172; B65B 61/02; Y10T 2203/172; Y10T 83/0215; Y10T 156/1064; Y10T 83/04
USPC .......... 206/138, 438; 292/19, 80, 81, 87, 89, 292/91, 300, 303, 304; 53/420; 156/257; 215/261; 219/121.6; 220/200
See application file for complete search history.

(56) References Cited

U.S. PATENT DOCUMENTS

| | | |
|---|---|---|
| 3,951,293 A | 4/1976 | Schulz |
| 4,863,051 A | 9/1989 | Eibner et al. |
| | (Continued) | |

*Primary Examiner* — J. Gregory Pickett
*Assistant Examiner* — Niki M Eloshway
(74) *Attorney, Agent, or Firm* — Polsinelli PC (57) ABSTRACT

A seal for containers is provided that allows the scent or aroma from the substance within the container to come through, while preventing leakage of the substance from within the container and/or physical contact of the substance by the consumer. More particularly, a seal is provided having at least one slit scoring fewer than all of the layers of the seal. The slit(s) will allow a consumer to sniff the scent or aroma released through the slit, while the seal remains secured to the container, extending shelf life of the substance, and preventing leakage, as well as, contamination, damage and/or reduced volume caused by consumers sampling the products.

8 Claims, 4 Drawing Sheets

Related U.S. Application Data (60) Provisional application No. 61/662,055, filed on Jun. 20, 2012.

(56) References Cited

U.S. PATENT DOCUMENTS

| | | | |
|---|---|---|---|
| 5,176,271 | A | 1/1993 | Painchaud et al. |
| 5,688,544 | A * | 11/1997 | Bolton ................. B65D 17/502 156/69 |
| 5,730,306 | A | 3/1998 | Costa et al. |
| 6,065,642 | A | 5/2000 | Brown |
| 7,163,113 | B2 | 1/2007 | Manganiello et al. |
| 7,648,764 | B2 | 1/2010 | Yousif |
| 7,909,204 | B2 | 3/2011 | Antal, Sr. |
| 7,959,028 | B2 | 6/2011 | Leon |
| 8,225,954 | B1 * | 7/2012 | Triquet ................. B65D 51/20 215/232 |
| 2001/0023870 | A1 | 9/2001 | Mihalov et al. |
| 2004/0262418 | A1 | 12/2004 | Smith et al. |
| 2005/0252918 | A1 | 11/2005 | McKnight et al. |
| 2006/0228620 | A1 | 10/2006 | Martinson et al. |
| 2008/0260917 | A1 | 10/2008 | Sankey et al. |
| 2009/0250464 | A1 | 10/2009 | Jongsma et al. |
| 2012/0111758 | A1 * | 5/2012 | Lo .......................... B65D 51/22 206/524.6 |
| 2013/0341325 | A1 | 12/2013 | Bruna |
| 2014/0061196 | A1 * | 3/2014 | Thorstensen-Woll . B65D 77/10 220/270 |
| 2014/0076898 | A1 * | 3/2014 | Wiening .............. B65D 41/045 220/269 |

* cited by examiner

SCENT PERMEATION CONTAINER SEAL, CONTAINER INCLUDING SAID SEAL AND METHODS OF MAKING SAID SEAL AND SAID CONTAINER

CROSS-REFERENCE TO RELATED APPLICATIONS

The present application is a continuation-in-part of co-pending U.S. patent application Ser. No. 13/922,994, filed on Jun. 20, 2013, which application claimed priority from Provisional Patent Application No. 61/662,055, filed on Jun. 20, 2012; those applications being incorporated herein, by reference, in their entireties.

BACKGROUND OF THE INVENTION

Field of the Invention

The present invention relates to a seal for a container and, more particularly, to a seal for a container holding a cream, gel, powder, liquid, solid or other substance that allows the aroma or scent of the substance in the container to permeate the seal while maintaining the barrier properties of the seal and preventing leakage of the substance within the container.

Description of the Related Art

Seals have been commonly used on containers for many years, to prevent leakage or contamination of the substance within the container and to increase the shelf life of the product. For example, seals are used on containers containing cosmetics, foods, drinks, medicines and other items in the form of creams, gels, powders, liquids and other substances. Seals used for this purpose are typically placed over the opening on the container or, in some instances, within the cap on the container.

However, consumers often want to smell items having a fragrance or aroma, such as lotions, creams, body washes, shampoos, deodorants, perfumes, laundry detergents, air fresheners, coffee and spices, before purchasing the items. As a result, many products are sold today without seals because there is no commercially viable seal on the market today that allows consumers to smell the scent of the product within the container. Specifically, prior art seals are essentially hermetic seals intended to prevent leakage of the product from the container and to limit air flow into and out of the container to preserve the product and maximize the product's shelf life. In so doing, they trap the scent or aroma of the product within the container.

By limiting air flow into and out of the container, these prior art hermetic seals also often result in pressure build-up within the container that may cause the container to expand and collapse based on changes in the surrounding environmental conditions. Although venting seals have been developed to address the pressure build-up problem, these venting seals were not designed for scent permeation purposes and, therefore do not provide the ability to smell the scent of the product in a cost effective manner. As a result, scented products are often sold in containers without seals, so that consumers can remove the cap and smell the scent prior to purchase. The fact that many scented products are still sold in containers without seals today is evidence that the prior art seals do not allow adequate scent permeation in a cost effective manner.

The absence of a seal increases the possibility of spillage during transportation and the chances that a product may be tampered with or tainted prior to sale to the consumer. It is not uncommon for consumers to go beyond simply removing the cap and smelling the item, by actually applying some of the product onto their body to sample the product and its fragrance. In so doing, the consumer may stick their fingers into the substance or on the opening where the substance comes out. Oftentimes, after sampling the product, the consumer closes the cap and returns the container to the shelf in the store.

This sampling of the product causes several problems. From the consumer's perspective, by placing their fingers into the substance and/or coming in contact with the opening where the substance comes out, the sampler may be contaminating the substance and spreading germs/bacteria. Additionally, each time a consumer samples the product and then returns it to the shelf, the volume of the substance within the container decreases. As a result, the consumer that eventually purchases the product is unknowingly purchasing less than a full container of a product that may have been contaminated and/or contain germs/bacteria.

From the retailer's perspective, consumers that sample products and then return them to the shelf sometimes do not place the cap on tightly, which may result in spillage if the container is tilted or falls on its side. Additionally, the shelf life of the substance within the container may be reduced or altered by the absence of a seal on the container or having been opened and exposed to the surrounding environmental conditions by a sampling consumer prior to sale. Also, the absence of a seal on a container may result in the substance contacting and/or accumulating within the cap on the container, which may cause spillage when the cap is removed and a less appealing presentation to the consumer. These situations may result in the retailer being unable to sell the product or generating product returns or charge-backs, which may have an adverse effect on the retailer's, product manufacturer's or distributor's reputation and financial performance. Additionally, the retailer, manufacturer and/or distributor may incur liability if a consumer is harmed by the contaminated product.

There have been some attempts over the years to address this problem. More particularly, some venting and/or scent emitting seals have been made wherein a one piece, multi-layer induction seal is completely perforated and an additional membrane (not part of an induction seal) is bonded over the perforation. Specifically, one product utilizes a polytetrafluoroethylene (ePTFE) membrane in a section of the liner to allow air to enter and exit the container for venting purposes, while preventing leakage of the substance from within the container. One such induction liner is made by PERFORMANCE SYSTEMATIX INC. However, this product has not proved to be a commercially viable solution because it requires a complex manufacturing process to embed the ePTFE membrane within a cutout section of the liner, the cost of which is significantly greater than the cost to manufacture a conventional seal. It also does not provide the barrier properties provided by conventional seals that are required to restrict air flow into and out of the container, which adversely affects the shelf life of some products. Again, the fact that many scented products are still sold in containers without seals today is evidence that the prior art seals do not provide the combination of scent permeation, leak prevention and barrier property characteristics, in a cost effective manner, desired by product manufacturers today.

Accordingly, there is a need in the art for a seal for containers that allows the scent or aroma from the substance within the container to come through, while preventing leakage of the substance and maintaining the barrier properties necessary to maximize the shelf life of the product. What is further needed is an induction seal that accomplishes the foregoing purpose, without the need for adding additional membranes or materials to the induction seal. Any such seal should be capable of use with any type of container and any type of substance stored within the container. Such a seal should also be capable of being manufactured at a cost comparable to the cost of current conventional seals. The present invention is particularly suited to overcome those problems which remain in the art in a manner not previously known.

SUMMARY OF THE INVENTION

The present invention is directed towards a seal for containers that allows the scent or aroma from the substance within the container to come through, while preventing leakage of the substance within the container and physical contact with the underlying substance by the consumer and maintaining the barrier properties necessary to maximize the shelf life of the product.

In one particular embodiment of the invention, a one piece, multi-layer induction seal having at least one slit extending through at least one layer of the multi-layer induction seal. The at least one slit will allow a consumer to sniff the scent or aroma emitted through the slit(s), while the seal remains secured to the container, thereby providing a tamper evident seal that provides barrier properties and prevents leakage, as well as, contamination, damage and/or reduced volume caused by consumers sampling the products.

Other features, which are considered as characteristic for the invention, are set forth in the drawings and the appended claims.

Although the invention is illustrated and described herein as embodied in a scent permeation container seal, it is nevertheless not intended to be limited to the details shown, since various modifications and structural changes may be made therein without departing from the spirit of the invention and within the scope and range of equivalents of the claims.

The construction of the invention, together with additional objects and advantages thereof, will be best understood from the following description of the specific embodiments when read in connection with the accompanying drawings.

BRIEF DESCRIPTION OF THE DRAWINGS

For the purpose of illustrating the invention, there is shown in the drawings an exemplary embodiment that is presently preferred, it being understood however, that the invention is not limited to the specific methods and instrumentality's disclosed. Additionally, like reference numerals represent like items throughout the drawings. In the drawings.

DETAILED DESCRIPTION OF THE PREFERRED EMBODIMENT

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

Referring now to FIG. 1-5, there will be described a scent or aroma releasing seal 10, 10' in accordance with certain particular embodiments of the present invention. The seal 10, 10' are structured to be secured to a container 20 over its mouth or opening 22. In accordance with the principles of the present invention, the seal 10, 10' may be used on containers 20 containing foods, beverages, pharmaceuticals, nutraceuticals, cosmetics, confectionery, household products, air care and other items in the form of creams, gels, powders, liquids or solids, and other substances, so as to permit the scent or aroma of the product to be released through the seal, without providing direct access to the product. Note that, for the purposes of the present application, the terms "scent" and "aroma" are used interchangeably.

In one particular embodiment of the invention, the seal 10, 10' is generally circular and may include one or more tabs 18 around the circumferential edge thereof. Note that this is not meant to be limiting, as no tabs 18 may be included (see FIGS. 1-3) and/or other shapes of seal 10, 10' may be used. For example, an oval or rectangular seal 10, 10' may be provided to seal an oblong or rectangular opening or mouth 22, without departing from the scope or spirit of the present invention.

The seal 10, 10' is affixed to the mouth 22 of the container 20, but can be peeled off to access the contents of the container 20. In one particular embodiment, the seal 10, 10' is sealed over the mouth 22 of the container 20 and can be peeled off using a fingernail or, in embodiments having a tab 18, by grasping a tab 18 between the thumb and forefinger to facilitate removal of the seal 10, 10' from the mouth 22 of the container 20.

Additionally, in accordance with the present invention, it is desired that the seal 10, 10' include at least one slit 12 for permitting the scent or aroma of the product contained within the container 20 to pass through the seal 10, 10' without breaking the bond between the seal 10, 10' and the circumferential edge of the mouth 22.

Through the user of scent permeating seals having at least one slit 12, the scent or aroma can exit through the seal, but a consumer's fingers cannot pass through the mouth 22 to the product below. More particularly, the containers 20 are filled, either through the mouth 22, or through another orifice of the container 20 (i.e., for bottom or side loaded containers 20) and, a seal 10, 10', in accordance with the present invention, provides scent or aroma from the product to the consumer without the need for removing the seal 10, 10'. As can be seen from FIGS. 1-5, the seal 10, 10' of the present invention can be used with different types of containers 20 and caps 40, such as a threaded cap (FIGS. 1, 3 and 4), snap-closed and flip-top caps (FIGS. 2 and 5), or other types of caps know in the industry. As discussed above, the seal 10, 10' is bonded to the circumferential edge of the container 20 over the mouth 22, and the cap is closed thereover.

Additionally, as discussed above, the seal 10, 10' includes one or more scent permeating slits 12. In one particular embodiment of the present invention, the seal 10' includes three slits 12, arranged in the seal 10'. Note, however, that the seal of the present invention is not meant to be limited to only this number of slits or this configuration of slits, as more or fewer slits may be used in any desired configuration and/or location. Although illustrated in the present particular embodiment as a curved slit or sine wave slit, other shapes of slits can be used without departing from the scope and spirit of the present invention, including, but not limited to, slits of the types described in U.S. patent application Ser. No. 13/922,994, filed on Jun. 20, 2013, incorporated herein by reference. In another particular example, two or more slits could be provided through the seal in matched (FIG. 2) or offset (FIG. 5) pattern.

In connection with the present invention, the slit(s) 12 extend through fewer than all of the layers if, for example, permeation is possible through one or more of the layers. For example, in one particular embodiment, the bottom-most layer, i.e., the sealing layer, may permit permeation and, thus, would not need to be pierced by the slit(s) 12. The length, width, depth and angle of the slit(s) 12 are structured to allow the scent of the substance within the container 20 to permeate through the slit(s) 12 and to substantially prevent leakage out from the slit(s) 12 by the substance or product within the container 20, and still provide barrier properties. The length, width, depth and angle of the slit(s) 12 may vary depending upon the substance to be placed within the container 20 and the sniff test requirements and/or leak and barrier properties tests of the product manufacturer. For example, the slit(s) 12 may be larger for creams and gels than for substances of a lower viscosity or a more liquid nature. In addition, the number and depth of slit(s) 12 may vary depending upon the strength of the fragrance and aroma within the container 20. For example, only one slit 12 may be used for containers 20 holding more fragrant/aromatic substances, whereas multiple slits 12 may be used for containers 20 holding less fragrant/aromatic substances, so that the less fragrant/aromatic substance has a greater opportunity to permeate the seal 10, 10' and be sensed on the outside of the container 20.

Additionally, it is a feature of the present invention that the unslitted layer or layers of the seal 10, although permitting permeation of the scent, do not permit venting to occur through the seal 10. Thus, the seal 10 is a non-venting seal. More particularly, the intact layer or layers of the seal 10 do not permit a free flow of air or gas from inside the container 20 to the outside of the container 20.

In an alternate embodiment of the invention (described more particularly in connection with FIG. 10), the slit(s) may be formed through all of the layers of the seal, but at an angle, such that the slit entry point is offset through the body of the seal from its exit point.

The container 20 may be composed of any materials now known or later developed that are capable of having a tamper evident, removable seal with barrier properties secured to the container 20 and that are suitable for storage of the substance being sold. In one preferred embodiment, the container 20 is composed of polyethylene or polypropylene, PET or PVC, and the seal 10 is secured to the container 20 by conduction or heat induction. In another embodiment, the container 20 is glass and the seal is secured to the container 20 by an adhesive, conduction or heat induction. However, it should be appreciated that the seal 10 may be secured to the container 20 by any means now known or later developed, including, but not limited to heat induction sealing, conduction sealing, gluing, contact adhesive, etc. Once the seal 10, 10' has been secured over the mouth 22 of the container 20, a cap 40 is secured to the container 20 over the seal 10, 10'. In one particular embodiment of the invention, the cap 40 is a removable continuous thread closure. However, this is not meant to be limiting, as the seal 10, 10' can be used with any type of container 20 and closure 40, and for any type of substance stored within the container 20.

A consumer interested in the product stored within the container 20 may remove the cap 40 and smell the scent or aroma of the stored product released through the slits 12 in the seal 10, 10', without removing the seal 10, 10', 10" and without sampling, tampering with, contaminating and/or spilling the product.

Figure 1:
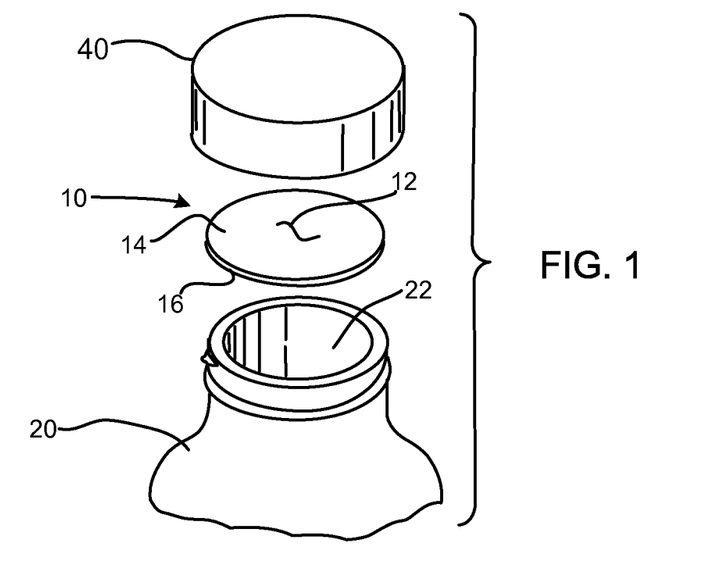
FIG. 1 is a partial exploded view of a seal positioned between the mouth of a container and a removable, threaded cap of the container in accordance with one particular embodiment of the invention.
Figure 2:
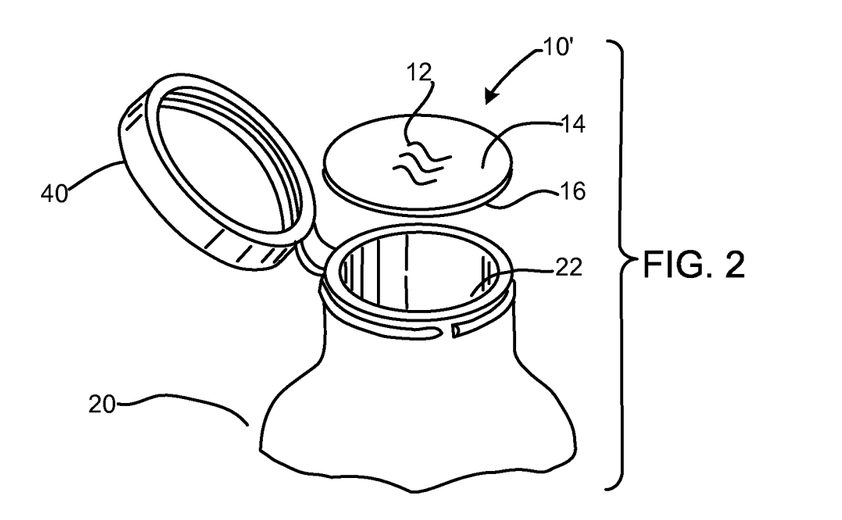
FIG. 2 is a partial exploded view of a seal positioned between the mouth of a container and a dispensing or flip-top closure in accordance with another particular embodiment of the invention.
Figure 3:
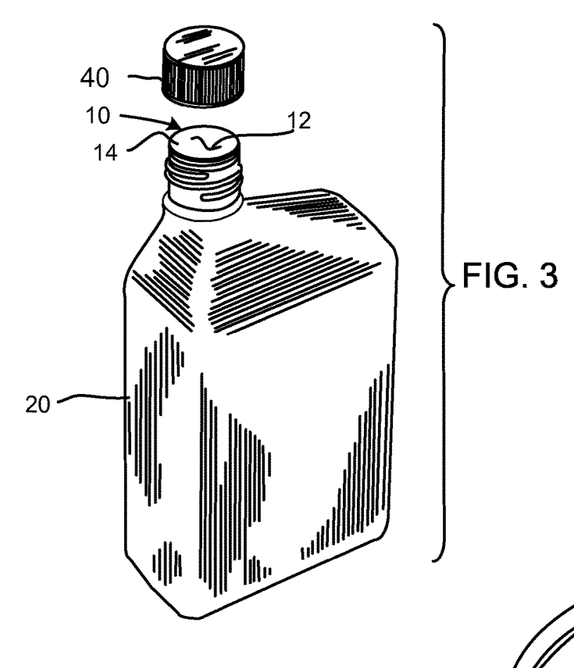
FIG. 3 is a perspective view of a container having a seal in accordance with one particular embodiment of the present invention secured over the mouth of the container.
Figure 4:
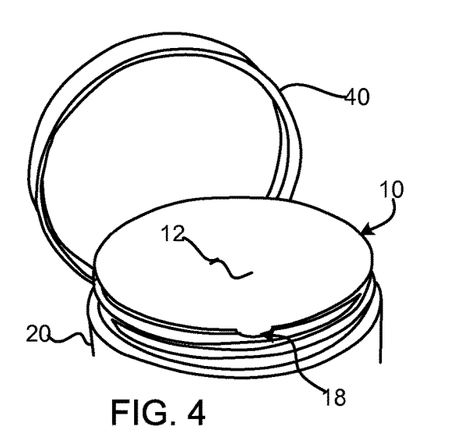
FIG. 4 is a partial perspective view of a seal in accordance with another particular embodiment of the invention sealed to the mouth of a container.
Figure 5:
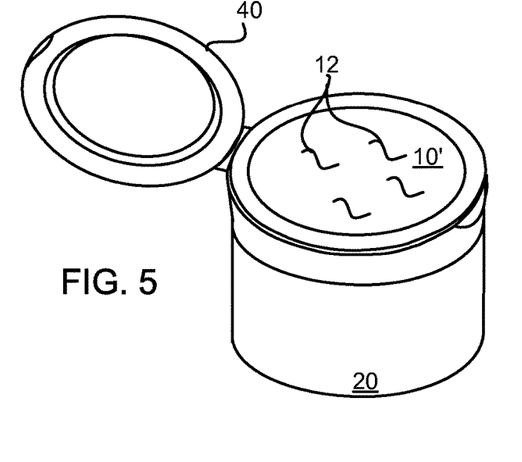
FIG. 5 is a partial exploded view of a seal positioned between the mouth of a container and a dispensing or flip-top closure in accordance with another particular embodiment of the invention.
Figure 6A:
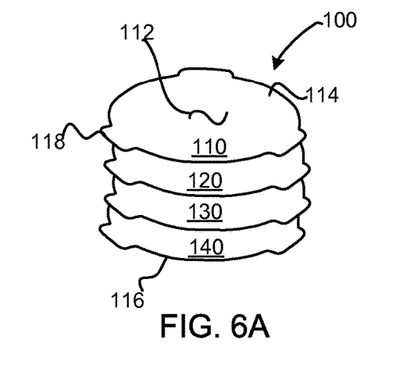
FIG. 6A is an exploded view of a seal in accordance with a further particular embodiment of the invention.
Figure 6B:
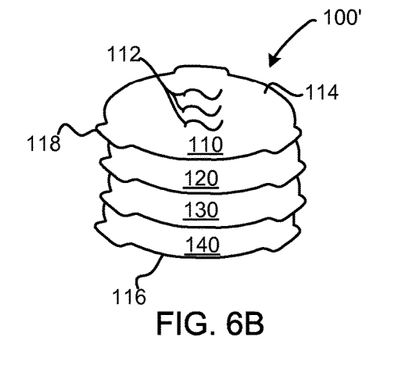
FIG. 6B is an exploded view of a seal in accordance with still a further particular embodiment of the invention.
Figure 7:
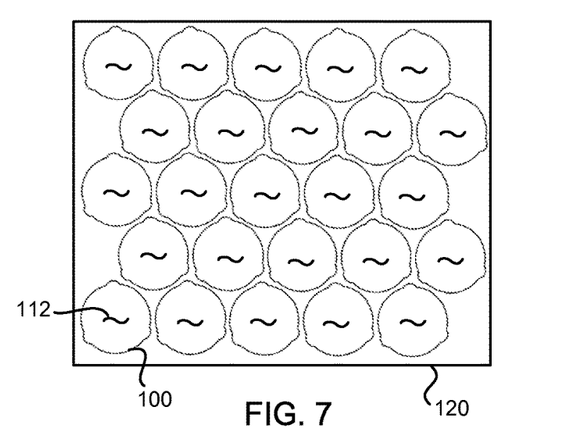
FIG. 7 is a top plan view of a sheet of multi-layer induction seals in accordance with one particular embodiment of the invention.

Referring now to FIGS. 6A-7, there is shown one particular embodiment of a seal 100 or 100', which can be used as the seals 10, 10' of FIGS. 1-5. In the present preferred embodiment, the seals 100, 100' have a one piece, multi-layer construction. More particularly, in one particular embodiment of the invention, the seal 100, 100' is an induction seal including a polyester film layer 110, a layer of EPE foam 120, a layer of aluminum foil 130 and a sealing layer 140. It should be noted that more or fewer layers, or layers of other materials than listed herein, may be used without departing from the spirit of the present invention.

The seal 100, 100' includes at least one slit 112 formed in at least one layer thereof. As discussed above, in the most preferred embodiment of the present invention, the slit(s) 112 are made through fewer than all of the layers of the multi-layer induction seal 100, 100'. By leaving at least a portion of one of the induction seal layers 110, 120, 130, 140, intact, the seal of the present invention eliminates any need for a further layer, membrane or material to be laminated to the seal 100, 100' after cutting of the slit(s) 112. Thus, in its most preferred embodiment, the present invention takes a standard one piece, multi-layer induction seal 100, 100' and scores a slit or slits in one or more layers, but less than all of the layers, from the top face 114 and/or from the bottom face 116, to permit scent to permeate from the product in a container (20 of FIGS. 1-5), through the seal 100, 100', while preventing venting through the seal and/or slit(s).

In the present particular embodiment illustrated in the figures, the slit 112 is shaped like a wave (i.e., in the present particular embodiment, a sine wave). Note that other slit shapes can be used, as desired, including, but not limited to, slits shaped as otherwise described herein and/or slits configured as a line, a circle, an alphanumeric character, a different form of a wave (i.e., cosine; point of inflection; sawtooth; etc) and/or slits of the types described in U.S. patent application Ser. No. 13/922,994. It should be understood that, while still part of the sheet 120, each seal 100 can be made to have more than one slit 112, as shown more particularly in FIGS. 5 and 6B, without departing from the scope and spirit of the present invention. In other words, each seal 100, 100' includes at least one slit 112, but can include two or more slits 112.

Although illustrated in the figures as being in the top layer 110 of the seal 100, 100', if desired, the slit(s) 112 could be formed in the bottom layer or layers of the seal 100, 100' and the top layer 110 can be left unperforated. Whether scoring of the slits is performed from the top layer 110 down or from the bottom layer 140 up may have a direct effect on the scent permeation, leakage and barrier properties of the seal 100, 100'. Consequently, selection of top side scoring or bottom side scoring is made on a case by case basis in order to optimize scent/aroma permeation through a seal 100, 100', leakage prevention and shelf life for a particular product and packaging combination. Additionally, the barrier properties of the seal 100, 100' (currently measured in terms of oxygen transmission rates (OTR) and moisture vapor transmission rates (MVTR)) can be further controlled by adjusting (reducing or increasing) the size, depth and/or number of slits created in the seal 100, 100'. In the present invention, the barrier properties of the unperforated layer(s) are maintained so as to permit permeation (near to hermetic levels) through the unscored layers, while preventing venting through the seal 100, 100'.

Referring now to FIG. 7, there is shown a web sheet of bulk seal material 120 from which a plurality of individual seals 100 are cut or punched. Web sheet 120 is assembled as a one-piece, multi-layer sheet prior to slitting, die cutting and/or punching the seals 100 from the web sheet. Thus, in the present embodiment, the web sheet 120 is, first, made from a plurality of individual sheets. Subsequently, the slits 112 are formed, and finally, the seals 100 are separated from the composite web sheet 120. Alternately, if desired, seals 10, 10', 100, 100' can be made from strips of composite, multi-layered materials, mounted on reels, that are fed through a lining/punching machine to die cut and punch the seal.

The seal 10, 10', 100, 100' can be manufactured using rotary die, flat die or a laser method of cutting to control the size and shape of the seal and the length, width, depth and angle of the slit(s) 12, 112 during the manufacturing process. It should be appreciated, however, that other cutting methods now known or later developed may alternatively be used within the spirit and scope of the present invention.

Figure 8:
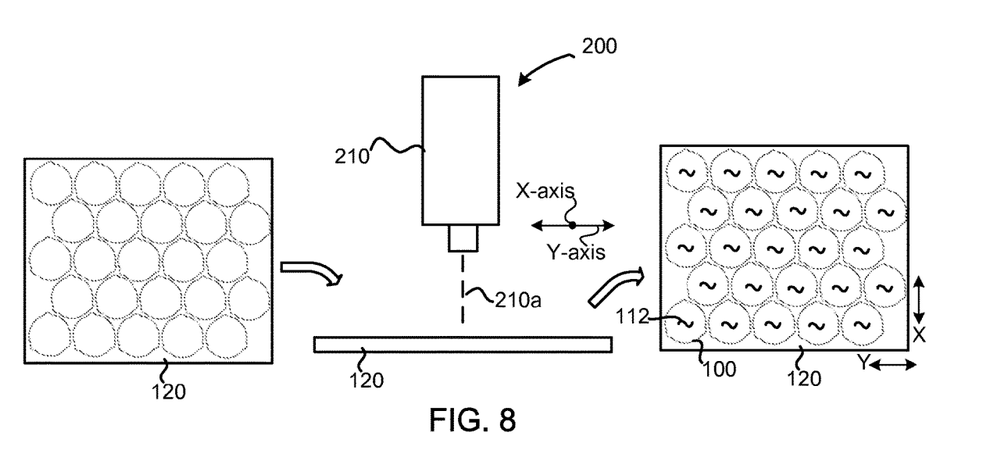
FIG. 8 is an illustration of a scent or aroma permeating seal being made in accordance with a further embodiment of the invention.

Referring now to FIGS. 6A and 8, there will be described a method for forming slits 112 in seals 100 (or, if desired, 100' of FIG. 6B), in accordance with one particular embodiment of the present invention. More particularly, a sheet 120 including a plurality of multi-layer induction seals 100 (not yet provided with a slit or cut from the sheet 120) is provided to a station 200 including a laser 210. Sheet 120 can be an individual sheet 120 of seals (such as the web sheet 120, above), as shown, or can be part of a roll of seals provided to the station 200. Additionally, although illustrated as having precut seals 100 on the sheet 120, this is not meant to be limiting. Rather, if desired, the sheet 120 can have the seals precut thereon, or the sheet 120 can be a bulk sheet 120 (not having the seals precut thereon) when provided to the laser 210, such that the slits are ablated into the bulk material and, subsequently, the seals 100 are die cut from the slitted bulk material.

The laser 210 can be any type of laser desired, such as, but not limited to, a gas laser (e.g., Galvo laser, a $CO_2$ laser), a fiber laser, a semiconductor laser, etc. In one particularly preferred embodiment of the invention, the laser 210 has a power of 6.5 Watts or more. The sheet 120 is registered under the laser 210, and the laser 210 is operated to form the slit 112 in at least part of each seal 100 using ablation performed by a laser beam 210a. The sheet 120 leaves the laser station 200 with slits 112 formed in each seal 100. The seals 100 can then be cut from the sheet 120 to produce individual induction seals 100. If desired, more than one laser 210 can be provided at the station 200, to increase speed and/or provide for more paths through the station 200.

In one particular embodiment of the system 200, the slits 112 are formed, using the laser 210, through one or more layers, but through fewer than all layers, of the multilayer seal material of sheet 120. Although illustrated in the figures as being made in the top face, in practice, the laser ablation may be performed from the top (white) side or from the bottom (foil) side, or from both, as desired. In one particularly preferred embodiment of the invention, the laser ablation is performed on the bottom (foil) side of the seal 140, so that the slit is not open from the top of the seal 100 and also does not interrupt, or distract from, any markings printed on the top face of the seal 100. The slit(s) 112 can be made in one or both of the top face 114 and/or bottom face 116 of the seal 100, 100'.

The use of a laser 210 is particularly desirable and advantage because it can be used to very precisely control the thickness of the resultant slit 112. For example, the laser can be accurately controlled to cut through only the thinnest layer of the seal 100, which in one particular embodiment is 0.0005 inches (12.7 microns). If desired, the laser 210 can be used to cut through as little as a partial layer of the seal 100 or through more than one layer of the seal 100, without departing from the scope and spirit of the present invention. In the most preferred embodiment of the present invention, fewer than all of the layers of the multilayer seal 100 are cut by the laser 210. For example, layers 110, 120 and 130 may be cut by the laser, leaving the sealing layer 140, or another scent permeable top layer, intact as a scent permeable layer inhibiting leakage of product through that layer and maintaining the barrier properties of the seal 100. Similarly, layers 140, 130 and 120 can be cut by the laser, leaving the polyester film layer 110, or another scent permeable top layer, intact to inhibit leakage of product and maintain the barrier properties of the seal 100, while permitting the scent of the product to permeate through the seal 100. If desired, as few as one layer and as many as three layers can be cut by the laser 210, without departing from the scope and spirit of the present invention.

Additionally, although depicted in FIG. 11 as performing the ablation at a normal incidence to the sheet 120 (i.e., the laser beam 210a being perpendicular to the sheet 120), the slits 112 can be made at this normal incidence, or can be made at an angle relative to the top plane of the sheet 120 by angling the laser 210 or using a lens system that causes the laser beam 210a to strike the seal 100 at a non-normal angle. Further, the slit 112 can be formed in the seal 100 in a single pass of the laser beam 210a, or in two or more passes, as desired.

In one particular example, described for illustrative purposes only, the slit 112 can be cut through one or more layers of the multilayer seal 100, by performing five passes of the laser to form the desired slit pattern (sinusoid, in the present example) in the aluminum (back) side of the seal 100, at a depth of 0.0085 inches through the seal. Preferably, the slit 112 is made by performing from 1 to 8 passes of the laser beam 210a over each seal 100 in the sheet 120. The laser 210 can be stepped in the X axis and Y axis directions, if desired, in order to make the slit in each seal 100. Alternately, the sheet 120 can be stepped in the X and Y axis directions and the laser may remain stationary. In a further alternate embodiment, the laser is stepped along the X-axis, only and the sheet 120 is part of a roll that is rolled across the laser station 200 in the direction of the Y-axis.

In one particular example, described for illustrative purposes only, the slits 112 can be cut through one or more layers of the multilayer seal 100 (or 100'), by performing two or more passes of the laser to form the desired slit pattern (sinusoid, in the present example) in the aluminum (back) side of the seal 100, at a depth of 0.0065 inches through the seal.

In one particularly preferred embodiment of the invention, in order to achieve an optimal permeation level for each product, multiple ablation passes are performed by the laser 210 on each seal 100, and a plurality of slits 112 are made in each or the seals 100, as shown, for example, in FIG. 5 or 6B. Each slit 112 can be formed by one ablation pass of the laser 210, or, more preferably in the present embodiment, is formed from multiple ablation passes of the laser 210.

Figure 9:
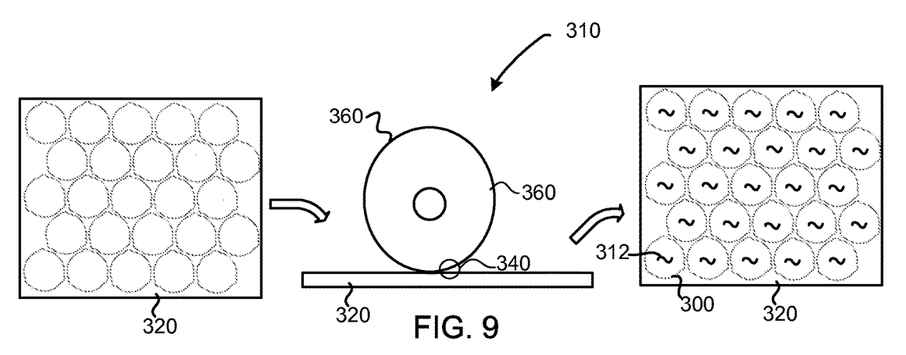
FIG. 9 is an illustration of a scent or aroma permeating seal being made in accordance with another embodiment of the invention.
Figure 9A:
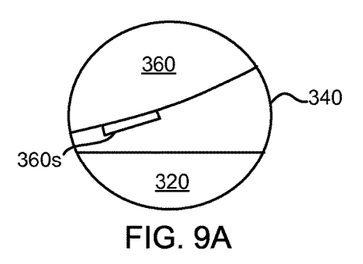
FIG. 9A is an enlargement of a portion of FIG. 9.
Figure 9B:
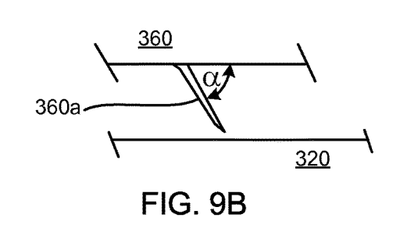
FIG. 9B is a portion of the view shown in FIG. 9A shown from the side.

Referring now to FIGS. 9-9B, there is shown another embodiment of the present invention for cutting slits into at least one layer of a multilayer seal 300. In the present preferred embodiment, a one-piece, multi-layer web sheet 320 (which can be as described in connection with the web sheet 120 of FIG. 7) is fed to a rotary cutting station 310 having a rotary cutter 360 with blades 360a. Although shown as having the seals 300 precut on the sheet 320, this is not meant to be limiting, as precut sheets 320 or bulk sheet material 320 may be provided to the cutting station 310, as desired, without departing from the scope or spirit of the present invention. Alternately, the rotary cutter 360 can be configured to receive bulk sheet material 320 and cut the seals 300 and slits 312 simultaneously (i.e., with the seals being cut all the way through the sheet 320, but the slits 312 being cut through fewer than all layers of the sheet 320).

More particularly, in the present preferred embodiment, the blades 360a are used to score the seal 300, while still on the sheet 320, to form the slits 312. Note that, in order to score the slits 312 in all of the seals 300 of a row on the sheet 320, a plurality of blades 360a aligned with (and thus hidden behind) the blade 360a shown by the enlarged portion 340 of FIG. 9 illustrated in FIG. 9A. In the present invention, the height of the rotary cutter 360 relative to the sheet 320 can be controlled such that the blade 360a cuts through fewer than all layers of the seal 300. Thus, the barrier properties of the seal 300 can be maintained such that permeation (including scent permeation) can occur through the unscored layer or layers, but venting and leakage cannot.

Figure 10:
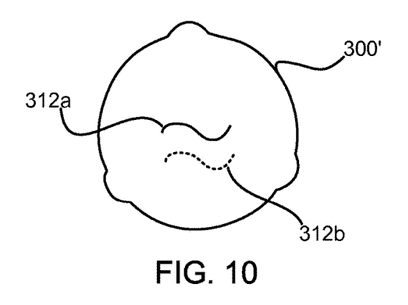
FIG. 10 is a top plan view of a seal in accordance with another particular embodiment of the present invention.

Referring now to FIGS. 9-10, in one particular embodiment, the blades 360a on the rotary cutter 360 are angled by an angle α relative to the surface of the rotary cutter 360 (i.e., a non-normal angle), so as to cut into the sheet 320 at an angle as rolled over the sheet 320. Resultantly, the slit 312 formed in the seals 300' is angled (as illustrated by FIG. 10) through one or more layers of the seal 300', but less than all of the layers, at a non-normal angle, with the perforation 312b through a distal layer of the seal 300' being linearly displaced from the perforation 312a through the proximal or entry layer of the seal 300'. Such a cut permits scent to permeate from the slit 312, while the angled cut inhibits leakage of product out from the slit 312.

The seals of the present invention provides a simple, cost effective solution that will allow consumers to sample the scent or aroma of a product while the seal remains secured to the container. As a result, manufacturers currently selling products without seals will now be able to include seals on their containers and receive the benefits that seals provide, including maintaining product integrity and barrier properties, extending shelf life and making the seal tamper evident, preventing leakage, preventing products from being contaminated and/or damaged by consumers sampling the products and reducing the volume of unsaleable products resulting from leakage, contamination and damage.

As can be seen from the foregoing, the present invention provides a seal for containers that allows the scent or aroma from the substance within the container to come through, while preventing leakage of the substance within the container and maintaining barrier properties to maximize shelf life. Such a seal can be used with any type of container and with any type of substance or product stored within the container. Additionally, it should be appreciated that the present invention may utilize other seal designs, materials and configurations now known or later developed that are capable of being removably secured to a container, preventing leakage of the substance within the container and maintaining barrier properties, without departing from the spirit of the invention. More particularly, it should be appreciated that the seals of the present invention may be embodied in a wide range of structures and designs, and may be suitable for use with many different types of containers.

Because the seals 10, 10', 100, 100', 300, 300' of the present inventions are capable of use with many different designs, materials and configurations known in the seal industry and may be manufactured and supplied to container manufacturers as precut discs and/or in rolls consistent with current practices, it can be utilized by closure and container manufacturers and end users using existing lining, sealing and capping equipment and current manufacturing processes and technologies. Additionally, because the seal of the present invention may be manufactured using current, commonly used seal designs, materials and constructions and does not require any specialty equipment or manufacturing processes, it is inexpensive to manufacture and can be readily incorporated into the closure and container manufacturing processes. Further, it can be seen that a seal in accordance with the present invention can be manufactured at a cost comparable the cost of current conventional seals.

While the invention has been described, disclosed, illustrated and shown in various terms of certain embodiments or modifications, which it has presumed in practice, the scope of the invention is not intended to be, nor should it be deemed to be, limited thereby and such other modifications or embodiments as may be suggested by the teachings herein are particularly reserved, especially as they fall within the breadth and scope of the claims.

I claim:

1. An induction seal for a container containing a substance having a scent or aroma, comprising:
 a one-piece, multi-layer body including a polyester film layer, a layer of EPE foam, a layer of aluminum foil and a sealing layer;
 at least one slit extending through fewer than all of the polyester film layer, the layer of EPE foam, the layer of aluminum foil and the sealing layer of said multi-layer body, said at least one slit configured to pass scent or aroma from the substance through the seal while restricting the passage of the substance through the seal; and wherein the intact layer or layers of the multi-layer induction seal through which the at least one slit does not extend are non-venting, such that they are configured to not permit a free flow of air or gas from inside the container to outside of the container.

2. The seal of claim 1, wherein the length, width, depth and angle of the at least one slit is structured to allow the scent or aroma of the substance within the container to permeate through the slits and to restrict leakage out from the slits by the substance or product within the container.

3. The seal of claim 1, wherein the at least one slit has the characteristics of a slit produced by laser ablation.

4. The seal of claim 3, wherein said slit passes through at least said aluminum layer.

5. The seal of claim 3, wherein said slit passes through at least said polyester film layer.

6. The seal of claim 5, wherein the at least one slit is shaped as a wave.

7. The seal of claim 6, wherein the at least one slit is more than one wave shaped slit.

8. A container including a body defining an internal cavity accessible through an opening defined by a circumferential lip, the container including a seal according to claim 1 bonded directly to the lip over the opening.

* * * * *